(12) United States Patent
Shi et al.

(10) Patent No.: US 12,395,298 B2
(45) Date of Patent: Aug. 19, 2025

(54) INFORMATION CONFIGURATION METHOD AND APPARATUS, AND TERMINAL

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Yun Fang, Dongguan (CN); Yingpei Huang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 438 days.

(21) Appl. No.: 17/885,453

(22) Filed: Aug. 10, 2022

(65) Prior Publication Data

US 2022/0393826 A1 Dec. 8, 2022

Related U.S. Application Data

(63) Continuation of application No. PCT/CN2020/074668, filed on Feb. 10, 2020.

(51) Int. Cl.
*H04L 5/00* (2006.01)
*H04L 27/26* (2006.01)
(Continued)

(52) U.S. Cl.
CPC ...... *H04L 5/0051* (2013.01); *H04L 27/26025* (2021.01); *H04W 72/0446* (2013.01); *H04W 72/51* (2023.01)

(58) Field of Classification Search
CPC .. H04L 5/0051; H04W 72/51; H04W 72/0446
See application file for complete search history.

(56) References Cited

U.S. PATENT DOCUMENTS 11,190,320 B2 * 11/2021 Choi ............... H04W 72/1268
2019/0174466 A1 * 6/2019 Zhang .............. H04L 5/0057
(Continued)

FOREIGN PATENT DOCUMENTS

CN 106559195 A 4/2017
CN 110535580 A 12/2019
(Continued)

OTHER PUBLICATIONS

Guangdong OPPO Mobile Telecommunications Corp., Ltd., International Search Report and Written Opinion, PCT/CN2020/074668, Oct. 30, 2020, 16 pgs.
(Continued)

*Primary Examiner* — James P Duffy
(74) *Attorney, Agent, or Firm* — Morgan, Lewis & Bockius LLP

(57) ABSTRACT

Embodiments of the present application provides an information configuration method and apparatus, and a terminal. The method includes: receiving, by a first terminal, first configuration information. The first configuration information is used to determine at least one Sounding Reference Signal (SRS) resource set group, each SRS resource set group in the at least one SRS resource set group includes at least one SRS resource set, and each SRS resource set in the at least one SRS resource set comprises at least one SRS resource. For multiple SRS resources in a same SRS resource set transmitted on a same slot, there is an interval of Y symbols between two adjacent SRS resources in the multiple SRS resources, and a value of Y is determined based on a subcarrier spacing of the SRS resources and/or a first capability of the first terminal.

20 Claims, 4 Drawing Sheets

Receive, by a first terminal, first configuration information, wherein the first configuration information is used to determine at least one SRS resource set group, each SRS resource set group in the at least one SRS resource set group includes at least one SRS resource set, and each SRS resource set in the at least one SRS resource set includes at least one SRS resource; wherein for multiple SRS resources in a same SRS resource set transmitted on a same slot, there is an interval of Y symbols between two adjacent SRS resources in the multiple SRS resources, and a value of Y is determined based on a subcarrier spacing of the SRS resources and/or a first capability of the first terminal

301

(51) Int. Cl.
  *H04W 72/0446* (2023.01)
  *H04W 72/51* (2023.01)

(56) References Cited

U.S. PATENT DOCUMENTS

| | | | |
|---|---|---|---|
| 2019/0349972 | A1 | 11/2019 | Nam et al. |
| 2020/0052853 | A1 | 2/2020 | Qin et al. |
| 2020/0220676 | A1* | 7/2020 | Xu .......................... H04B 7/06 |
| 2020/0252241 | A1* | 8/2020 | Park ................... H04L 25/0224 |
| 2020/0382250 | A1 | 12/2020 | Choi et al. |
| 2020/0389885 | A1* | 12/2020 | Tomeba ................ H04W 72/21 |
| 2022/0346126 | A1 | 10/2022 | Li et al. |

FOREIGN PATENT DOCUMENTS

| | | | |
|---|---|---|---|
| CN | 110536453 | A | 12/2019 |
| WO | WO2019096248 | A1 | 5/2019 |
| WO | WO2019/164309 | A1 | 8/2019 |
| WO | WO2019/218108 | A1 | 11/2019 |
| WO | WO2021/159257 | A1 | 8/2021 |

OTHER PUBLICATIONS

Intel Corporation, On SRS Antenna Switching in FR2, 3GPP TSG-RAN WG4 Meeting #90 Bis, R4-1903123, Xi'An, China, Apr. 8-Apr. 12, 2019, 6 pgs.

Guangdong OPPO Mobile Telecommunications Corp., Ltd., EP20918526.3, Extended European Search Report, Dec. 19, 2022, 11 pgs.

3GPP TS 38.214 V15.0.0 (Feb. 2018); Technical Specification Group Radio Access Network; NR; Physical layer procedures for data (Release 15)—XP051398854, 76 pgs.

Guangdong OPPO Mobile Telecommunications Corp., Ltd., EP20918526.3, First Office Action, Sep. 18, 2023, 7 pgs.

* cited by examiner

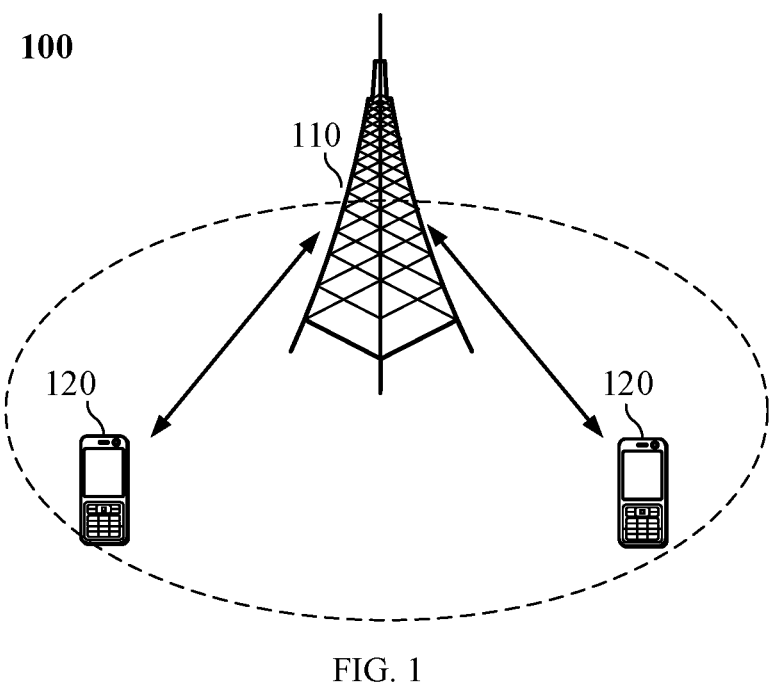
FIG. 1
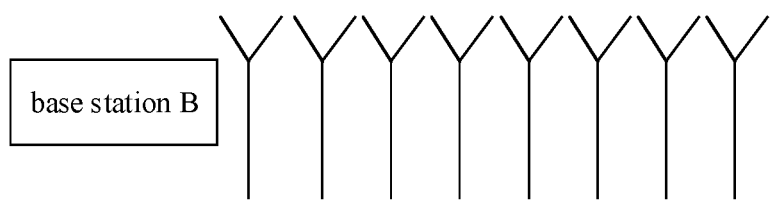
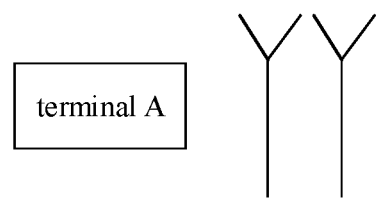
FIG. 2

Receive, by a first terminal, first configuration information, wherein the first configuration information is used to determine at least one SRS resource set group, each SRS resource set group in the at least one SRS resource set group includes at least one SRS resource set, and each SRS resource set in the at least one SRS resource set includes at least one SRS resource; wherein for multiple SRS resources in a same SRS resource set transmitted on a same slot, there is an interval of Y symbols between two adjacent SRS resources in the multiple SRS resources, and a value of Y is determined based on a subcarrier spacing of the SRS resources and/or a first capability of the first terminal

INFORMATION CONFIGURATION METHOD AND APPARATUS, AND TERMINAL

CROSS-REFERENCE TO RELATED APPLICATIONS

The present application is a continuation application of PCT application No. PCT/CN2020/074668, entitled "INFORMATION CONFIGURATION METHOD AND APPARATUS, AND TERMINAL" filed on Feb. 10, 2020, the contents of which are hereby incorporated by reference in their entirety.

TECHNICAL FIELD

Embodiments of the present disclosure generally relate to the mobile communication technical field, and more particularly, to an information configuration method, an information configuration device, and a terminal.

BACKGROUND

In New Radio (NR), the network side may configure a Sounding Reference Signal (SRS) resource for a terminal for antenna switching. In antenna switching, switching time is required, and thus a guard period of several symbols is needed between SRS resources. At present, the configuration mode of the guard period between SRS resources is relatively simple, and the flexibility is poor.

SUMMARY

Embodiments of the present disclosure provide an information configuration method, an information configuration device, and a terminal.

An embodiment of the present disclosure provides an information configuration method, including:
receiving, by a first terminal, first configuration information, wherein the first configuration information is used to determine at least one Sounding Reference Signal (SRS) resource set group, each SRS resource set group in the at least one SRS resource set group includes at least one SRS resource set, and each SRS resource set in the at least one SRS resource set includes at least one SRS resource;
wherein for multiple SRS resources in a same SRS resource set transmitted on a same slot, there is an interval of Y symbols between two adjacent SRS resources in the multiple SRS resources, and a value of Y is determined based on a subcarrier spacing of the SRS resources and/or a first capability of the first terminal.

An embodiment of the present disclosure provides an information configuration device, including:
a receiving unit configured to receive first configuration information, wherein the first configuration information is used to determine at least one Sounding Reference Signal (SRS) resource set group, each SRS resource set group in the at least one SRS resource set group includes at least one SRS resource set, and each SRS resource set in the at least one SRS resource set includes at least one SRS resource;
wherein for multiple SRS resources in a same SRS resource set transmitted on a same slot, there is an interval of Y symbols between two adjacent SRS resources in the multiple SRS resources, and a value of Y is determined based on a subcarrier spacing of the SRS resources and/or a first capability of the first terminal.

An embodiment of the present disclosure provides a terminal, including a processor and a memory, wherein the memory is configured to store a computer program, and the processor is configured to call and run the computer program stored in the memory to cause the terminal to perform the above information configuration method.

An embodiment of the present disclosure provides a chip configured to implement the above information configuration method.

Specifically, the chip includes a processor configured to call and run a computer program from a memory to cause an apparatus in which the chip is installed to perform the above information configuration method.

An embodiment of the present disclosure provides a computer-readable storage medium storing a computer program that causes a computer to perform the above information configuration method.

An embodiment of the present disclosure provides a computer program product including computer program instructions that cause a computer to perform the above information configuration method.

An embodiment of the present disclosure provides a computer program. When the computer program is run on a computer, the computer is caused to perform the above information configuration method.

By the above technical solutions, for the antenna switching function, the guard period between SRS resources is determined based on the subcarrier spacing of the SRS resources and/or the terminal capability, which can support more subcarriers, and support situations where the guard period has multiple options. Therefore, the configuration of the guard period between the SRS resources is more flexible.

BRIEF DESCRIPTION OF THE DRAWINGS

The drawings described herein, which constitute a part of the present disclosure, are used to provide further understanding of the present disclosure. The schematic embodiments and descriptions of the present disclosure are used to explain the present disclosure and do not constitute an improper limitation on the present disclosure. In the drawings:

FIG. 1 is a schematic diagram of a communication system architecture according to an embodiment of the present disclosure.

FIG. 2 is a schematic diagram of an antenna according to an embodiment of the present disclosure.

FIG. 3 is a schematic flowchart of an information configuration method according to an embodiment of the present disclosure.

DETAILED DESCRIPTION

Figure 4:
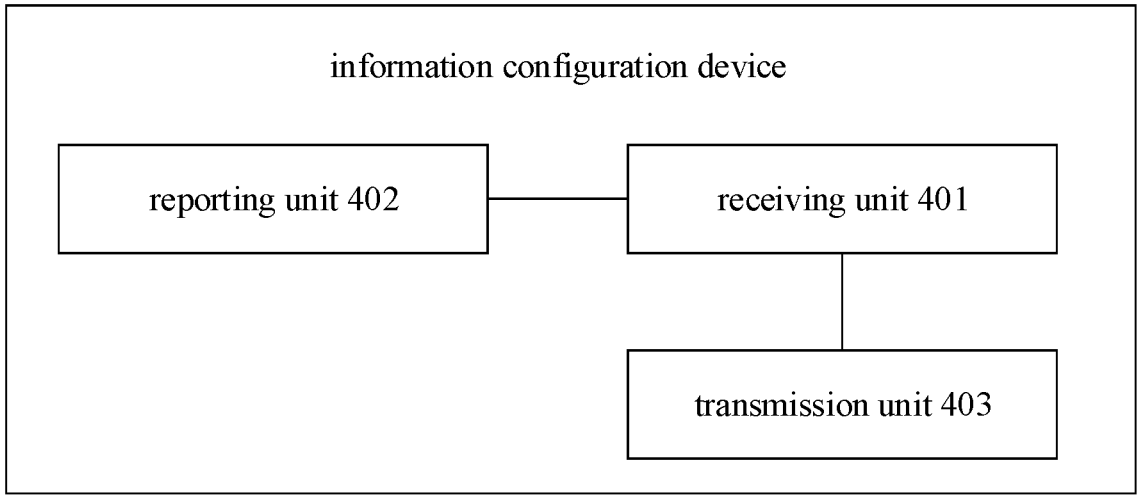
FIG. 4 is a schematic structural composition diagram of an information configuration device according to an embodiment of the present disclosure.

Technical solutions in embodiments of the present disclosure will be described below with reference to drawings.

The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

Embodiments of the present disclosure can be applied to various communication systems, such as: a Long Term Evolution (LTE) system, a LTE Frequency Division Duplex (FDD) system, a LTE Time Division Duplex (TDD) system, a 5G communication system or a future communication system, and so on.

As an example, the communication system 100 applied in embodiments of the present disclosure may be as shown in FIG. 1. The communication system 100 includes a network device 110, and the network device 110 may be a device that communicates with a terminal 120 (or called a communication terminal or a terminal device). The network device 110 can provide communication coverage for a specific geographic area, and can communicate with terminals in the coverage area. According to embodiments, the network device 110 may be an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future communication system, etc.

The communication system 100 further includes at least one terminal 120 within the coverage area of the network device 110. The "terminal" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal may be connected via a wireless interface, such as cellular networks, wireless local area network (WLAN), digital TV networks such as DVB-H networks, satellite networks, AM-FM broadcast transmitter; and/or the terminal is connected via a device of another terminal which is configured to receive/send communication signals; and/or the terminal is connected via an Internet of Things (IoT) device. A terminal set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal in 5G networks, or a terminal in the future evolved PLMN, etc.

According to some embodiments, a Device to Device (D2D) communication may be performed between the terminals 120.

According to some embodiments, the 5G communication system or 5G network may also be referred to as a New Radio (NR) system or NR network.

FIG. 1 exemplarily shows one network device and two terminals. According to other embodiments, the communication system 100 may include multiple network devices and the coverage of each network device may include other numbers of terminals, and embodiments of the present disclosure do not impose specific limitations on this.

According to some embodiments, the communication system 100 may further include other network entities such as a network controller or a mobility management entity, and embodiments of the present disclosure do not impose specific limitations on this.

It should be understood that a device with a communication function in the network/system in embodiments of the present disclosure may be referred to as a communication device. Taking the communication system 100 shown in FIG. 1 as an example, the communication device may include the network device 110 and the terminals 120 having a communication function. The network device 110 and the terminals 120 may be the specific devices described above, and repeated descriptions will be omitted here. The communication device may also include other devices in the communication system 100, such as a network controller, a mobility management entity, or other network entities, and embodiments of the present disclosure do not impose specific limitations on this.

It should be understood that the terms "system" and "network" are often used interchangeably herein. The term "and/or" herein is only an association relationship describing associated objects, which means that there can be three kinds of relationships, for example, A and/or B can mean: A alone, B alone, and A and B together. In addition, the character "/" generally indicates that the associated objects before and after "/" are in an "or" relationship.

In order to facilitate the understanding of the technical solutions provided by embodiments of the present disclosure, related technologies involved in embodiments of the present disclosure are described below.

Multiple-Input Multiple-Output (MIMO) Transmission

MIMO has been widely used in wireless communication systems, such as 3G, 4G (LTE), 5G (NR), and WiFi. Using the MIMO technology, gains of the following forms can be obtained:

spatial diversity gain;
beamforming gain (precoding gain);
spatial multiplexing gain.

In order to obtain the beamforming gain (also called precoding gain) or spatial multiplexing gain, a transmitting end needs to determine a beamforming matrix (or precoding matrix) for signal transmission. For simplicity of description, "precoding" and "beamforming" will be used interchangeably in the following description, and no distinction will be made. Even if any one of the terms is used, related description can be applied to both "precoding" and "beamforming" scenarios.

The determination of the precoding matrix often needs to be based on corresponding transmitting channel information. Optionally, on this basis, the determination of the precoding matrix may also be based on channel information, interference information and so on corresponding to paired users in multi-user MIMO. Therefore, for the determination of the precoding matrix of a terminal A, a basic requirement is to obtain a certain form of channel information of a transmitting channel corresponding to the terminal A.

In practical systems, for obtaining the channel information of the transmitting channel corresponding to terminal A, there can be the following two methods:

1. Feedback method: a base station B sends a reference signal X (for example, Channel State Information Reference Signal (CSI-RS)), the terminal A obtains corresponding downlink channel information by performing measurement according to the reference signal X, and then determines feedback information. The base station B determines a corresponding precoding matrix according to the feedback information from the terminal A, and sends Physical Downlink Shared Channel (PDSCH) or Physical Downlink Control Channel (PDCCH), or other downlink channel or reference signal to the terminal A. The feedback information may include the following forms (may include a part of the following information):

a. Rank Indication (RI) information, including rank information;
   b. Channel Quality Indicator (CQI) information, including information about Modulation and Coding Scheme (MCS);
   c. Precoding Matrix Indicator (PMI) information, including codebook information 2. Method based on channel reciprocity: the terminal A sends SRS (Sounding Reference Signal) signal according to configuration information from base station B, and the base station B performs measurement to obtain a corresponding uplink channel according to the received SRS information. According to the reciprocity of the uplink and downlink channels, the base station B can determine the corresponding precoding matrix corresponding to the terminal A, and use the precoding matrix to transmit PDSCH or PDCCH, or other downlink channel or reference signal.

It should be noted that the feedback method is suitable for Time Division Duplexing (TDD) systems and Frequency Division Duplexing (FDD) systems, and the method based on channel reciprocity is mainly suitable for TDD systems, and can also be applied in FDD systems with partial reciprocity.

Antenna Switching

It can be seen from the above technical solutions that the method based on channel reciprocity requires the terminal A to send the SRS signal. In NR, configuration of the SRS resource set corresponding to this type of SRS signal is as follows:

The usage parameter (usage) in SRS-ResourceSet is set to antenna switching (antennaSwitching), and one SRS resource set includes one or more SRS resources.

The sounding procedure for this type of SRS signal is also called UE sounding procedure for DL CSI acquisition, and antenna switching is also called SRS transmission port switching (SRS Tx port switching), SRS switching or SRS transmission switching (SRS Tx switching).

For a typical terminal (such as a smart phone), the number of receiving antennas is often greater than the number of transmitting antennas, or in other words, the number of receiving channels is often greater than the number of transmitting channels. For example, as shown in FIG. 2, the terminal A has two antennas. The terminal A supports one transmitting channel and two receiving channels, that is, at each moment, only one antenna is used for transmission (connected to the one transmitting channel), and two antennas can be used for reception. Therefore, if terminal A sends SRS (one transmitting channel, and the corresponding SRS resource is one SRS port) once, the base station B can only obtain 8*1 channel information, that is, channel information corresponding to half of the channels is not known, and this will affect obtaining of better precoding performance.

It should be noted that the above description assumes that the base station B transmits information to the terminal A through a precoding matrix, and the technical solutions in embodiments of the present disclosure are not limited to this and can also be applied in a situation where a terminal B transmits information to the terminal A through a precoding matrix, and the communication between the two terminals is, for example, Device to Device (D2D) communication, or vehicle to X (V2X) communication, or sidelink communication.

In order to solve the above problem, the network can configure two SRS resources, each SRS resource has one SRS port, the two SRS resources are transmitted from two antennas, respectively, and the two SRS resources are transmitted at different times, for example, the SRS signal corresponding to SRS resource 0 is transmitted from antenna 0 at time T0 (the transmitting channel is switched to antenna 0 at this time), and the SRS signal corresponding to SRS resource 1 is transmitted from antenna 1 at time T1 (the transmitting channel is switched to antenna 1 at this time). In this way, by transmitting SRS twice, the base station B can obtain 8*2 channel information. The above two SRS resources are configured in the same SRS resource set, and the corresponding usage is set as "antennaSwitching".

Whether the terminal A supports "antennaSwitching" (this can be equivalently called as whether the terminal A supports SRS Tx port switching) and what type of antenna switching is supported can be implemented in different ways. Therefore, such information is reported through UE capability. The UE capability report corresponding to NR has the following: t1r2, t1r4, t2r4, t1r4-t2r4, t1r1, t2r2, t4r4, notSupported, where "t1r2" for 1T2R, "t2r4" for 2T4R, "t1r4" for 1T4R, "t1r4-t2r4" for 1T4R/2T4R, "t1r1" for 1T1R, "t2r2" for 2T2R, or "t4r4" for 4T4R. The corresponding description regarding each capability is as follows:

For 1T2R: 0 or 1 or 2 (maximum 2) SRS resource sets can be configured, and the resource type (resource Type) corresponding to the two SRS resource sets is configured as different values, that is, the resource type can be aperiodic or semi-persistent (SemiPersistent), or periodic. When two SRS resource sets are subsequently configured, similar configurations can be made unless otherwise specified. Each SRS resource set contains two SRS resources, each SRS resource has one SRS port, the two SRS resources are transmitted at different symbols, and the two SRS resources in the same SRS resource set correspond to different antenna ports.

For 2T4R: 0 or 1 or 2 SRS resource sets can be configured. Each SRS resource set contains two SRS resources, each SRS resource has two SRS ports, the two SRS resources are transmitted at different symbols, and an antenna port pair corresponding to the SRS port pair of the second SRS resource in the same SRS resource set is different from an antenna port pair corresponding to the SRS port pair of the first SRS resource in the same SRS resource set.

For 1T4R: 0 or 1 SRS resource set can be configured (periodic or semi-persistent). Each SRS resource set contains four SRS resources, and each SRS resource has one SRS port. Different SRS resources are transmitted at different symbols, and different SRS resources correspond to different antenna ports.

For 1T4R: 0 or 2 SRS resource sets can be configured (all configured as aperiodic). There are a total of four SRS resources in the two SRS resource sets, each SRS resource has one SRS port, and the four SRS resources are transmitted on different symbols in two different slots. The four SRS resources correspond to different antenna ports. The four SRS resources may be that each SRS resource set contains two SRS resources, or that one SRS resource set contains three SRS resources, and the other SRS resource set contains one SRS resource. The power parameters of RRC configurations corresponding to the two SRS resource sets are the same, and the higher layer parameter aperiodicSRS-Resource Trigger is the same, but the parameter slotOffSRS is different for resource sets.

For 1T=1R, or 2T=2R, or 4T=4R: 0 or 1 or 2 SRS resource sets can be configured, each SRS resource set contains one SRS resource, and the SRS port corresponding to the SRS resource is 1, 2 or 4.

If the UE reports that the UE supports "t1r4-t2r4", all SRS resources in the SRS resource sets need to be configured with the same SRS port (that is, one or two SRS ports).

It should be noted that "xTyR" or "txry" is generally used to describe the antenna switching capability of a terminal, that is, what type of antenna switching is supported. The antenna switching capability represented by xTyR is usually used in the physical layer. If x and y are equal, it is often represented as xT=yR. In embodiments of the present disclosure, in order to simplify the description, no distinguishing is made and the antenna switching capability is still written as xTyR. The antenna switching capability represented by txry is usually carried in UE capability signaling. If a terminal supports xTyR type antenna switching, the terminal can transmit SRS resources from x antennas at the same time, and can receive downlink signals from y antennas at the same time. Further, the terminal includes y antennas or more antennas in total for reception, and the terminal can transmit SRS signals using x antenna ports among the y antennas.

Antenna Switching Interval

In antenna switching, switching time is required. Thus, the terminal needs to be configured with the following guard period: there is a guard period of Y symbols between SRS resources in the same SRS resource set transmitted in the same slot, and the terminal does not transmit any other signals on the guard period of Y symbols. The value of Y is shown in Table 1 below:

TABLE 1

| μ | $\Delta f = 2^\mu \cdot 15$ [kHz] | Y [symbol] |
|---|---|---|
| 0 | 15 | 1 |
| 1 | 30 | 1 |
| 2 | 60 | 1 |
| 3 | 120 | 2 |

In the Table, different μ corresponds to different subcarrier spacings (SubCarrier Spacings, SCSs), and Δf is the subcarrier spacing (unit is kHz).

As can be seen from Table 1 above, the value of Y only considers four subcarrier spacing cases, and for high-frequency communication, other subcarrier spacings need to be considered. In addition, for one subcarrier spacing, the value of Y is a single value, and the value of Y is not adaptively configured in combination with different UE capabilities. In view of the above, the following technical solutions of the embodiments of the present disclosure are proposed. It should be noted that, in the description of the embodiments of the present disclosure, in order to simplify the identification, xTyR is uniformly used to represent the antenna switching type supported by the terminal (or the antenna switching capability supported by the terminal). The antenna switching type can also be expressed as xT=yR when x=y.

FIG. 3 is a schematic flowchart of an information configuration method according to an embodiment of the present disclosure. As shown in FIG. 3, the information configuration method includes the following steps:

In step 301, a first terminal receives first configuration information. The first configuration information is used to determine at least one SRS resource set group, each SRS resource set group in the at least one SRS resource set group includes at least one SRS resource set, and each SRS resource set in the at least one SRS resource set includes at least one SRS resource. For multiple SRS resources in a same SRS resource set transmitted on a same slot, there is an interval of Y symbols between two adjacent SRS resources in the multiple SRS resources, and a value of Y is determined based on a subcarrier spacing of the SRS resources and/or a first capability of the first terminal.

In an example implementation of the present disclosure, a usage parameter corresponding to each of the at least one SRS resource set is set to a first value, and the first value is used to indicate that the SRS resource set is used for antenna switching.

Here, the usage parameter is set in the "usage" domain in the Radio Resource Control Information Element (RRC IE). Here, the expression "domain" can also be replaced by a field. The first value is, for example, antennaSwitching, and the first value is used to indicate that the SRS resource set is used for antenna switching or SRS transmission port switching (SRS Tx port switching).

In an example embodiment of the present disclosure, a resource type parameter corresponding to the at least one SRS resource set in a same SRS resource set group is set to a same value.

Here, the value of the resource type parameter is one of the following:

a second value, wherein the second value is used to indicate that the at least one SRS resource set is an aperiodic resource;

a third value, wherein the third value is used to indicate that the at least one SRS resource set is a semi-persistent resource; or a fourth value, wherein the fourth value is used to indicate that the at least one SRS resource set is a periodic resource.

During specific implementations, the resourceType in the SRS-ResourceSet corresponding to respective SRS resource sets in the same SRS resource set group is configured to be the same value. The resourceType may be configured as one of the following: aperiodic, semiPersistent, or periodic. For example, there are two SRS resource sets in a SRS resource set group 1, and the resourceType in the SRS-ResourceSet corresponding to the two SRS resource sets is configured with the same value.

Further, according to some embodiments, if the value of the resource type parameter is the third value or the fourth value, the corresponding SRS resource set group includes one SRS resource set.

In specific implementations, if the resourceType in the SRS-ResourceSet corresponding to the SRS resource set is configured as periodic or semi-persistent (semiPersistent), then the corresponding SRS resource set group is equal to this SRS resource set (that is, the SRS resource set group only contains one SRS resource set).

In an example embodiment of the present disclosure, a resource type parameter corresponding to the at least one SRS resource set in different SRS resource set groups is set to different values.

Here, the value of the resource type parameter is one of the following:
- a second value, wherein the second value is used to indicate that the at least one SRS resource set is an aperiodic resource;
- a third value, wherein the third value is used to indicate that the at least one SRS resource set is a semi-persistent resource; or
- a fourth value, wherein the fourth value is used to indicate that the at least one SRS resource set is a periodic resource.

In specific implementation, the resourceType in the SRS-ResourceSet corresponding to the SRS resource set(s) in different SRS resource set groups may be configured with different values. For example, the resourceType in the SRS-ResourceSet corresponding to the SRS resource set(s) in a SRS resource set group 1 is configured as aperiodic, and the resourceType in the SRS-ResourceSet corresponding to the SRS resource set(s) in a SRS resource set group 2 is configured as periodic, and the resourceType in the SRS-ResourceSet corresponding to the SRS resource set(s) in a SRS resource set group 3 is configured as semiPersistent.

In example implementations of the present disclosure, the first configuration information may be transmitted in any of the following ways:

1) The first configuration information is sent by a network device to the first terminal.

Here, the network device may be a base station, such as a gNB.

2) The first configuration information is sent by a second terminal to the first terminal.

Here, in the scenario of V2X communication or D2D communication or sidelink communication, the first configuration information may be delivered to the first terminal by the second terminal, which can better support the communication between terminals.

In example implementations of the present disclosure, the value of the subcarrier spacing corresponding to each SRS resource in the at least one SRS resource may be implemented using one of the following methods:

Method 1: The value of the subcarrier spacing corresponding to each SRS resource in the at least one SRS resource is one of 15 kHz, 30 kHz, 60 kHz, 120 kHz, 240 kHz, 480 kHz, 960 kHz, and 1920 kHz.

Method 2: The value of the subcarrier spacing corresponding to each SRS resource in the at least one SRS resource is one of 15 kHz, 30 kHz, 60 kHz, 120 kHz, 240 kHz, 480 kHz, and 960 kHz.

Method 3: The value of the subcarrier spacing corresponding to each SRS resource in the at least one SRS resource is one of 15 kHz, 30 kHz, 60 kHz, 120 kHz, 240 kHz, and 480 kHz.

Method 4: The value of the subcarrier spacing corresponding to each SRS resource in the at least one SRS resource is one of 15 kHz, 30 kHz, 60 kHz, 120 kHz, and 240 kHz.

It should be noted that, in addition to supporting 15 kHz, 30 kHz, 60 kHz, and 120 kHz, the value of the subcarrier spacing corresponding to each SRS resource in the at least one SRS resource may also support at least one of the following: 240 kHz, 480 kHz, 960 kHz, and 1920 kHz. That is, "any one or more of 240 kHz, 480 kHz, 960 kHz, and 1920 kHz" can be combined with "15 kHz, 30 kHz, 60 kHz, 120 kHz" to form a new value range for the subcarrier spacing. The embodiments of the present disclosure can support more values of the subcarrier spacing, so as to better support communication on higher frequency bands.

In embodiments of the present disclosure, for multiple SRS resources in the same SRS resource set transmitted on the same slot, there is an interval of Y symbols between two adjacent SRS resources in the multiple SRS resources, and the value of Y is determined based on the subcarrier spacing of the SRS resources and/or the first capability of the first terminal. Here, the first terminal does not transmit other signals in the interval of Y symbols. The interval may also be referred to as a guard period. Or, for multiple SRS resources in the same SRS resource set transmitted on the same slot, there is an interval of Y or more symbols between two adjacent SRS resources in the multiple SRS resources, and the value of Y is determined based on the subcarrier spacing of the SRS resources and/or the first capability of the first terminal.

The interval of Y symbols or the interval of more than Y symbols described later may mean that no other signal is transmitted in the interval of Y symbols or more, or this limitation is not required.

In an example embodiment, the value of Y is determined based on a first table. Here, the first table is used to determine the value of Y corresponding to at least one of the following subcarrier spacings: 15 kHz, 30 kHz, 60 kHz, 120 kHz, 240 kHz, 480 kHz, 960 kHz, and 1920 kHz. Reference may be made to Application Example 1 to Application Example 15 below.

Here, the first table may be determined based on a protocol.

In an example embodiment, the value of Y is determined based on the first capability of the first terminal. In this way, the value of Y may be determined according to different capabilities of the first terminal. On the one hand, the guard period can be reduced for terminals with strong capabilities, thereby reducing system overhead; on the other hand, the implementation complexity and/or cost of terminals with low capabilities can be reduced, and the promotion of terminals with low capabilities can be facilitated.

Further, the value of Y is determined according to a first table, and the first table is determined according to the first capability of the first terminal. Here, the first table is used to determine the value of Y corresponding to at least one of the following subcarrier spacings: 15 kHz, 30 kHz, 60 kHz, 120 kHz, 240 kHz, 480 kHz, 960 kHz, and 1920 kHz. Here, the first capability of the first terminal has a corresponding relationship with the first table, and the first table is specified by a protocol, which can effectively control the number of tables and reduce excessive fragmentations in terminal implementation.

In specific implementations, the first terminal reports the first capability of the first terminal to the network device or the second terminal, and the network device or the second terminal determines the first table based on the first capability of the first terminal, and determines the value of Y based on the first table, and then sends the first configuration information to the first terminal.

In the above solutions, optionally, the first capability of the first terminal includes a capability of the first terminal for at least one frequency band, or includes a capability of the first terminal for at least one frequency band combination.

Here, for reporting the first capability, the first terminal may report the corresponding capability for a frequency band or frequency band combination, that is, the reported capability is for a certain frequency band or frequency band combination, such as frequency band 1 (or frequency band combination) 1) corresponding to capability a, frequency band 2 (or frequency band combination 2) corresponding to capability b. Reporting capability for a frequency band or a frequency band combination can reduce the overhead of reporting signaling.

In the above solution, optionally, the first capability of the first terminal includes a capability of the first terminal for at least one subcarrier spacing.

Here, for reporting the first capability, the first terminal may report the corresponding capability for a subcarrier spacing. That is, the reported capability is for a certain subcarrier spacing. For example, the subcarrier spacing 1 corresponds to the capability c, the subcarrier spacing 2 corresponds to capability d. Reporting capability for a subcarrier spacing can report a more accurate value of Y.

In the above solutions, the first table may be an existing table or one of the tables in Application Example 1 to Application Example 15.

In an example embodiment, the first terminal reports first capability signaling, and the first capability signaling is used to determine the first capability of the first terminal. The first capability signaling carries the value of Y corresponding to the first capability of the first terminal.

Here, the first terminal reports the corresponding value of Y through the first capability signaling, which realizes that the first terminal directly reports the required interval, and can more flexibly support terminals with various capabilities, and the terminal implementation is more flexible.

Further, according to some embodiments, the first capability of the first terminal includes a capability of the first terminal for at least one frequency band, or a capability for at least one frequency band combination. Accordingly, the first capability signaling carries the value of Y reported by the first terminal for each frequency band in the at least one frequency band, or the value of Y reported for each frequency band combination in the at least one frequency band combination. Here, the first terminal reports the value of Y corresponding to each frequency band or each frequency band combination, which can reduce the overhead of reporting signaling.

Further, according to some embodiments, the first capability of the first terminal includes the capability of the first terminal for at least one subcarrier spacing. The first capability signaling carries the value of Y reported by the first terminal for each subcarrier spacing in the at least one subcarrier spacing. Here, the first terminal reports the value of Y corresponding to each subcarrier spacing, and the reported value may be more accurate.

Further, according to some embodiments, the reporting of the first capability signaling may adopt any one of the following methods:

1) The first terminal reports the first capability signaling to the network device.

Here, the network device may be a base station, such as a gNB.

Optionally, the first capability signaling is forwarded by the network device to the second terminal. For example, after receiving the first capability signaling sent by the first terminal, the base station forwards the first capability signaling to the second terminal, which can better support communication between terminals.

2) The first terminal reports the first capability signaling to the second terminal.

For example, in the scenario of V2X communication or D2D communication or sidelink communication, the first terminal reports the first capability signaling to the second terminal, which can better support communication between terminals.

In an example embodiment of the present disclosure, if the value of Y is greater than or equal to a first threshold value or the value of Y is a specific value, then: for a first SRS resource and a second SRS resource in the same SRS resource set, the first SRS resource and the second SRS resource are transmitted on different slots, and there is an interval of N symbols between the first SRS resource and the second SRS resource, N is a positive integer greater than or equal to Y. Here, when the value of Y is relatively large, sufficient interval is left for the SRS resources transmitted on different slots to reduce the complexity of terminal implementation.

Here, optionally, the first threshold value or the specific value is determined by a protocol.

In an example embodiment of the present disclosure, if the value of Y is greater than or equal to the first threshold value or the value of Y is a specific value, then: for a first SRS resource and a second SRS resource in different SRS resource sets, there is an interval of N symbols between the first SRS resource and the second SRS resource, where N is a positive integer greater than or equal to Y. Here, when the value of Y is relatively large, sufficient interval is left for the SRS resources in different SRS resource sets to reduce the complexity of terminal implementation.

Here, optionally, the first threshold value or the specific value is determined by a protocol.

In an example embodiment of the present disclosure, if the value of Y is greater than or equal to the first threshold value or the value of Y is a specific value, then: for a first SRS resource and a second SRS resource in different SRS resource sets in the same SRS resource set group, there is an interval of N symbols between the first SRS resource and the second SRS resource, and N is a positive integer greater than or equal to Y. Here, when the value of Y is relatively large, sufficient interval is left for the SRS resources in different SRS resource sets to reduce the complexity of terminal implementation.

Here, optionally, the first threshold value or the specific value is determined by a protocol.

In embodiments of the present disclosure, for the at least one SRS resource configured by the first configuration information, the at least one SRS resource occupies a part or all of the symbols in one slot.

In an example embodiment, the number of symbols occupied by the SRS resource is determined based on a second capability of the first terminal. Here, for terminals with different capabilities, the resources that can be allocated are different, so that the SRS capacity can be improved.

In an example embodiment, the part or all of the symbols are at least one of the last symbols in the one slot. For example: the part or all of the symbols are one or more of the last 6 symbols in the one slot.

Specifically, the implementation of the part or all of the symbols may be any of the following:

1) If the first terminal does not report the second capability of the first terminal, the part or all of the symbols are one or more symbols in the last 6 symbols in the one slot.

Here, when the first terminal does not report the stronger capability, the capability supported by the terminal in the existing Rel-15 is used.

2) If the first terminal reports the second capability of the first terminal, the part or all of the symbols are one or more symbols in the last Z1 symbols in the one slot, wherein the value of Z1 is determined based on a protocol. Here, when the first terminal reports the stronger capability, the part or all of the symbols are one or more symbols in the last Z1 symbols in the one slot, which can reduce the overhead of capability reporting signaling.

Here, the value of Z1 is determined based on a protocol. Further, optionally, the value of Z1 is 14. It should be noted that the value of Z1 is not limited to 14, and may also be other values.

3) If the first terminal reports the second capability of the first terminal and the second capability carries a value of Z2, the part or all of the symbols are one or more symbols in the last Z2 symbols in the one slot, where Z2 is a positive integer. Here, the first terminal reporting can flexibly indicate different values of Z2, providing flexibility for different implementations of the terminal.

Further, optionally, the value of Z2 is greater than 6; or, the value of Z2 is greater than or equal to 6.

4) If the first terminal reports the second capability of the first terminal and the second capability carries a value of Z3, the part or all of the symbols are one or more symbols in the Z3-th symbol to the last symbol in the one slot, where Z3 is a positive integer. Here, the first terminal reporting can flexibly indicate different values of Z3, providing flexibility for different implementations of the terminal.

Further, optionally, in the case where the symbols in one slot are calculated from the first symbol, the value of Z3 is smaller than 9; or, the value of Z3 is smaller than or equal to 9.

Further, optionally, in the case where the symbols in one slot are calculated from the 0-th symbol, the value of Z3 is smaller than 8; or, the value of Z3 is smaller than or equal to 8.

In an example implementation of the present disclosure, each SRS resource set in the at least one SRS resource set is configured to support antenna switching of the xTyR type, where x and y are both positive integers.

Here, optionally, the value of y is 6 or 8. A larger value of y can support the first terminal to have more receiving antennas, so that the network device or the second terminal can obtain a more complete channel between itself and the first terminal, thereby providing assistance in precoding determination, and improving mutual communication performance.

Further, optionally, if x is smaller than y (x<y), different SRS resource sets cannot be transmitted in the same slot, thereby avoiding the need to introduce additional intervals in the same slot and reducing system overhead.

Further, optionally, if x is equal to y (x=y), different SRS resource sets cannot be transmitted on the same symbol, so as to avoid discarding the transmission on some SRS resources because the first terminal cannot support simultaneous transmission, thereby improving the system performance.

In an example embodiment, the SRS ports of different SRS resources in the same SRS resource set correspond to different terminal antenna ports (UE antenna ports).

In an example embodiment, the SRS ports of different SRS resources in the same SRS resource set group in the at least one SRS resource set group correspond to different terminal antenna ports (UE antenna ports).

In an example embodiment, the first terminal reports a third capability of the first terminal, and the third capability of the first terminal is used to indicate that the first terminal supports the antenna switching of the type xTyR.

Further, optionally, the value of x is: one of 1, 2, and 4;

Further, optionally, the value of y is: one of 1, 2, 4, 6, and 8; or one of 1, 2, 4, and 8; or one of 1, 2, 4, and 6. The value of y is used to support terminals that have more receiving antennas and support antenna switching capability.

Here, the reporting of the third capability of the first terminal may adopt any one of the following manners:

1) The first terminal reports the third capability of the first terminal to the network device.

Here, the network device may be a base station, such as a gNB.

Optionally, the third capability of the first terminal is forwarded to the second terminal by the network device. For example, after receiving the third capability of the first terminal sent by the first terminal, the base station forwards the third capability of the first terminal to the second terminal.

2) The first terminal reports the third capability of the first terminal to the second terminal.

For example, in a scenario of V2X communication or D2D communication or sidelink communication, the first terminal reports the third capability of the first terminal to the second terminal.

In an example implementation of the present disclosure, the first terminal sends an SRS signal to the network device or the second terminal on the SRS resource based on the first configuration information. Further, the SRS signal is used for the network device or the second terminal to perform measurement, and determine the precoding corresponding to the first terminal based on the measurement result, and perform transmission of a channel or signal based on the precoding.

Here, optionally, the signal is PDSCH or PDCCH or PSSCH or PSCCH.

The implementations of the first table in embodiments of the present disclosure will be illustrated below by using application examples.

Application Example 1

For the implementation of the first table, reference can be made to the following Table 2, in which the correspondence between the subcarrier spacings and the values of Y is given, where μ is used to identify the subcarrier spacings, and Δf represents the values of the subcarrier spacings, and the unit of Δf is kHz.

TABLE 2

| μ | $\Delta f = 2^\mu \cdot 15$ [kHz] | Y [symbol] |
| --- | --- | --- |
| 0 | 15 | 1 |
| 1 | 30 | 1 |
| 2 | 60 | 1 |
| 3 | 120 | 2 |
| 4 | 240 | 4 |
| 5 | 480 | 7 |
| 6 | 960 | 14 |
| 7 | 1920 | 27 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 2

For the implementation of the first table, reference can be made to the following Table 3, in which the correspondence between the subcarrier spacings and the values of Y is given, where $\mu$ is used to identify the subcarrier spacings, and $\Delta f$ represents the values of the subcarrier spacings, and the unit of $\Delta f$ is kHz.

TABLE 3

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 2 |
| 4 | 240 | 4 |
| 5 | 480 | 7 |
| 6 | 960 | 13 |
| 7 | 1920 | 26 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 3

For the implementation of the first table, reference can be made to the following Table 4, in which the correspondence between the subcarrier spacings and the values of Y is given, where $\mu$ is used to identify the subcarrier spacings, and $\Delta f$ represents the values of the subcarrier spacings, and the unit of $\Delta f$ is kHz.

TABLE 4

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 2 |
| 4 | 240 | 3 |
| 5 | 480 | 6 |
| 6 | 960 | 12 |
| 7 | 1920 | 24 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 4

For the implementation of the first table, reference can be made to the following Table 5, in which the correspondence between the subcarrier spacings and the values of Y is given, where $\mu$ is used to identify the subcarrier spacings, and $\Delta f$ represents the values of the subcarrier spacings, and the unit of $\Delta f$ is kHz.

TABLE 5

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 2 |
| 4 | 240 | 3 |
| 5 | 480 | 6 |
| 6 | 960 | 11 |
| 7 | 1920 | 22 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 5

For the implementation of the first table, reference can be made to the following Table 6, in which the correspondence between the subcarrier spacings and the values of Y is given, where $\mu$ is used to identify the subcarrier spacings, and $\Delta f$ represents the values of the subcarrier spacings, and the unit of $\Delta f$ is kHz.

TABLE 6

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 2 |
| 4 | 240 | 3 |
| 5 | 480 | 5 |
| 6 | 960 | 10 |
| 7 | 1920 | 20 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 6

For the implementation of the first table, reference can be made to the following Table 7, in which the correspondence between the subcarrier spacings and the values of Y is given, where $\mu$ is used to identify the subcarrier spacings, and $\Delta f$ represents the values of the subcarrier spacings, and the unit of $\Delta f$ is kHz.

TABLE 7

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 2 |
| 4 | 240 | 3 |
| 5 | 480 | 5 |
| 6 | 960 | 9 |
| 7 | 1920 | 18 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 7

For the implementation of the first table, reference can be made to the following Table 8, in which the correspondence between the subcarrier spacings and the values of Y is given, where $\mu$ is used to identify the subcarrier spacings, and $\Delta f$ represents the values of the subcarrier spacings, and the unit of $\Delta f$ is kHz.

TABLE 8

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 2 |
| 4 | 240 | 3 |
| 5 | 480 | 5 |
| 6 | 960 | 9 |
| 7 | 1920 | 17 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 8

For the implementation of the first table, reference can be made to the following Table 9, in which the correspondence between the subcarrier spacings and the values of Y is given, where $\mu$ is used to identify the subcarrier spacings, and $\Delta f$ represents the values of the subcarrier spacings, and the unit of $\Delta f$ is kHz.

TABLE 9

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 1 |
| 4 | 240 | 2 |
| 5 | 480 | 4 |
| 6 | 960 | 8 |
| 7 | 1920 | 15 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 9

For the implementation of the first table, reference may be made to the following Table 10, in which the correspondence between the subcarrier spacings and the values of Y is given, where $\mu$ is used to identify the subcarrier spacings, and $\Delta f$ represents the values of the subcarrier spacings, and the unit of $\Delta f$ is kHz.

TABLE 10

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 1 |
| 4 | 240 | 2 |
| 5 | 480 | 4 |
| 6 | 960 | 7 |
| 7 | 1920 | 13 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 10

For the implementation of the first table, reference may be made to the following Table 11, in which the correspondence between the subcarrier spacings and the values of Y is given, where $\mu$ is used to identify the subcarrier spacings, and $\Delta f$ represents the values of the subcarrier spacings, and the unit of $\Delta f$ is kHz.

TABLE 11

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 1 |
| 4 | 240 | 2 |
| 5 | 480 | 3 |
| 6 | 960 | 6 |
| 7 | 1920 | 11 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 11

For the implementation of the first table, reference may be made to the following Table 12, in which the correspondence between the subcarrier spacings and the values of Y is given, where $\mu$ is used to identify the subcarrier spacings, and $\Delta f$ represents the values of the subcarrier spacings, and the unit of $\Delta f$ is kHz.

TABLE 12

| $\mu$ | $\Delta f = 2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 1 |
| 4 | 240 | 2 |

TABLE 12-continued

| μ | $\Delta f = 2^\mu \cdot 15$ [kHz] | Y [symbol] |
|---|---|---|
| 5 | 480 | 3 |
| 6 | 960 | 5 |
| 7 | 1920 | 9 |

It should be noted that the bold rows in the above table are the correspondence between the newly added or modified subcarrier spacings and the values of Y. In specific implementations, only some or all of the rows may be added to the above table. For example, in one case, only the row corresponding to 240 is added to the table.

Application Example 12

For the implementation of the first table, reference may be made to the following Tables 13-1 and 13-2, in which the correspondence between the subcarrier spacings and the values of Y is given, where μ is used to identify the subcarrier spacings, and Δf represents the values of the subcarrier spacings, and the unit of Δf is kHz.

TABLE 13-1

| μ | $\Delta f = 2^\mu \cdot 15$ [kHz] | Y [symbol] |
|---|---|---|
| 0 | 15 | 1 |
| 1 | 30 | 1 |
| 2 | 60 | 1 |
| 3 | 120 | 2 |

TABLE 13-2

| μ | $\Delta f = 2^\mu \cdot 15$ [kHz] | Y [symbol] |
|---|---|---|
| 4 | 240 | 2 |
| 5 | 480 | 4 |
| 6 | 960 | 8 |
| 7 | 1920 | 15 |

In specific implementations, some or all of the rows in Table 13-1 and Table 13-2 can be combined. It should be noted that the bold rows in the above table are the correspondence between the newly added or modified subcarrier spacings and the values of Y. In specific implementations, only some or all of the rows may be added to the Table 13-1. For example, in one case, only the row corresponding to 240 is added to the Table 13-1.

Application Example 13

For the implementation of the first table, reference may be made to the following Table 14-1 and Table 14-2, in which the correspondence between the subcarrier spacings and the values of Y is given, where μ is used to identify the subcarrier spacings, and Δf represents the values of the subcarrier spacings, and the unit of Δf is kHz.

TABLE 14-1

| μ | $\Delta f = 2^\mu \cdot 15$ [kHz] | Y [symbol] |
|---|---|---|
| 0 | 15 | 1 |
| 1 | 30 | 1 |
| 2 | 60 | 1 |
| 3 | 120 | 2 |

TABLE 14-2

| μ | $\Delta f = 2^\mu \cdot 15$ [kHz] | Y [symbol] |
|---|---|---|
| 4 | 240 | 2 |
| 5 | 480 | 4 |
| 6 | 960 | 7 |
| 7 | 1920 | 13 |

In specific implementations, some or all of the rows in Table 14-1 can be combined with those in Table 14-2. It should be noted that the bold rows in the above table are the correspondence between the newly added or modified subcarrier spacings and the values of Y. In specific implementations, only some or all of the rows may be added to the above Table 14-1. For example, in one case, only the row corresponding to 240 is added to the Table 14-1.

Application Example 14

For the implementation of the first table, reference may be made to the following Table 15-1 and Table 15-2, in which the correspondence between the subcarrier spacings and the values of Y is given, where μ is used to identify the subcarrier spacings, and Δf represents the values of the subcarrier spacings, and the unit of Δf is kHz.

TABLE 15-1

| μ | $\Delta f = 2^\mu \cdot 15$ [kHz] | Y [symbol] |
|---|---|---|
| 0 | 15 | 1 |
| 1 | 30 | 1 |
| 2 | 60 | 1 |
| 3 | 120 | 2 |

TABLE 15-2

| μ | $\Delta f = 2^\mu \cdot 15$ [kHz] | Y [symbol] |
|---|---|---|
| 4 | 240 | 2 |
| 5 | 480 | 3 |
| 6 | 960 | 6 |
| 7 | 1920 | 11 |

In specific implementations, some or all of the rows in Table 15-1 and Table 15-2 can be combined. It should be noted that the bold rows in the above table are the correspondence between the newly added or modified subcarrier spacings and the values of Y. In specific implementations, only some or all of the rows may be added to the Table 15-1. For example, in one case, only the row corresponding to 240 is added to the Table 15-1.

Application Example 15

For the implementation of the first table, reference may be made to the following Table 16-1 and Table 16-2, in which the correspondence between the subcarrier spacings and the values of Y is given, where μ is used to identify the subcarrier spacings, and Δf represents the values of the subcarrier spacings, and the unit of Δf is kHz.

TABLE 16-1

| μ | $\Delta f = 2^\mu \cdot 15$ [kHz] | Y [symbol] |
|---|---|---|
| 0 | 15 | 1 |
| 1 | 30 | 1 |

TABLE 16-1-continued

| μ | Δf = $2^\mu \cdot 15$ [kHz] | Y [symbol] |
|---|---|---|
| 2 | 60 | 1 |
| 3 | 120 | 2 |

TABLE 16-2

| μ | Δf = $2^\mu \cdot 15$ [kHz] | Y [symbol] |
|---|---|---|
| 4 | 240 | 2 |
| 5 | 480 | 3 |
| 6 | 960 | 5 |
| 7 | 1920 | 9 |

In specific implementations, some or all of the rows in Table 16-1 and Table 16-2 can be combined. It should be noted that the bold rows in the above table are the correspondence between the newly added or modified subcarrier spacings and the values of Y. In specific implementations, only some or all of the rows may be added to the Table 16-1. For example, in one case, only the row corresponding to 240 is added to the Table 16-1.

FIG. 4 is a schematic structural composition diagram of an information configuration device according to an embodiment of the present disclosure, and the information configuration device is applied in a first terminal. As shown in FIG. 4, the information configuration device includes a receiving unit 401.

The receiving unit 401 is configured to receive first configuration information, wherein the first configuration information is used to determine at least one SRS resource set group, each SRS resource set group in the at least one SRS resource set group includes at least one SRS resource set, and each SRS resource set in the at least one SRS resource set includes at least one SRS resource.

For multiple SRS resources in a same SRS resource set transmitted on a same slot, there is an interval of Y symbols between two adjacent SRS resources in the multiple SRS resources, and a value of Y is determined based on a subcarrier spacing of the SRS resources and/or a first capability of the first terminal.

In an implementation, a usage parameter corresponding to each of the at least one SRS resource set is set to a first value, and the first value is used to indicate that the SRS resource set is used for antenna switching.

In an implementation, a resource type parameter corresponding to the at least one SRS resource set in a same SRS resource set group is set to a same value.

In an implementation, a value of the resource type parameter is one of the following:
 a second value, wherein the second value is used to indicate that the at least one SRS resource set is an aperiodic resource;
 a third value, wherein the third value is used to indicate that the at least one SRS resource set is a semi-persistent resource; or
 a fourth value, wherein the fourth value is used to indicate that the at least one SRS resource set is a periodic resource.

In an implementation, in response to the value of the resource type parameter being the third value or the fourth value, the at least one SRS resource set group includes one SRS resource set.

In an implementation, a resource type parameter corresponding to the at least one SRS resource set in different SRS resource set groups is set to different values.

In an implementation, the resource type parameter has a value which is one of the following:
 a second value, wherein the second value is used to indicate that the at least one SRS resource set is an aperiodic resource;
 a third value, wherein the third value is used to indicate that the at least one SRS resource set is a semi-persistent resource; or
 a fourth value, wherein the fourth value is used to indicate that the at least one SRS resource set is a periodic resource.

In an implementation, the first configuration information is sent to the first terminal by a network device.

In an implementation, the first configuration information is sent to the first terminal by a second terminal.

In an implementation, a value of the subcarrier spacing corresponding to each SRS resource in the at least one SRS resource is:
 one of 15 kHz, 30 kHz, 60 kHz, 120 kHz, 240 kHz, 480 kHz, 960 kHz, and 1920 kHz; or,
 one of 15 kHz, 30 kHz, 60 kHz, 120 kHz, 240 kHz, 480 kHz, and 960 kHz; or,
 one of 15 kHz, 30 kHz, 60 kHz, 120 kHz, 240 kHz, and 480 kHz; or,
 one of 15 kHz, 30 kHz, 60 kHz, 120 kHz, and 240 kHz.

In an implementation, the value of Y is determined based on a first table; or,
 the value of Y is determined based on the first capability of the first terminal.

In an implementation, the value of Y is determined according to the first table, and the first table is determined according to the first capability of the first terminal.

In an implementation, the first capability of the first terminal includes a capability of the first terminal for at least one frequency band, or includes a capability of the first terminal for at least one frequency band combination.

In an implementation, the first capability of the first terminal includes a capability of the first terminal for at least one subcarrier spacing.

In an implementation, the first table is used to determine the value of Y corresponding to at least one of the following subcarrier spacing:
 15 kHz, 30 kHz, 60 kHz, 120 kHz, 240 kHz, 480 kHz, 960 kHz, and 1920 kHz.

In an implementation, the device further includes a reporting unit 402.

The reporting unit 402 is configured to report first capability signaling, wherein the first capability signaling is used to determine the first capability of the first terminal, and the first capability signaling carries the value of Y corresponding to the first capability of the first terminal.

In an implementation, the first capability of the first terminal includes a capability of the first terminal for at least one frequency band, or a capability of the first terminal for at least one frequency band combination;
 wherein the first capability signaling carries the value of Y reported by the first terminal for each frequency band in the at least one frequency band, or the first capability signaling carries the value of Y reported by the first terminal for each frequency band combination in the at least one frequency band combination.

In an implementation, the first capability of the first terminal includes a capability of the first terminal for at least one subcarrier spacing;
 wherein the first capability signaling carries the value of Y reported by the first terminal for each subcarrier spacing in the at least one subcarrier spacing.

In an implementation, the reporting unit 402 is configured to:

report the first capability signaling to a network device.

In an implementation, the first capability signaling is forwarded by the network device to a second terminal.

In an implementation, the reporting unit 402 is configured to:

report the first capability signaling to a second terminal.

In an implementation, in response to the value of Y being greater than or equal to a first threshold value or the value of Y being a specific value:

for a first SRS resource and a second SRS resource in a same SRS resource set, the first SRS resource and the second SRS resource are transmitted on different slots, there is an interval of N symbols between the first SRS resource and the second SRS resource, and N is a positive integer greater than or equal to Y.

In an implementation, in response to the value of Y being greater than or equal to a first threshold value or the value of Y being a specific value:

for a first SRS resource and a second SRS resource in different SRS resource sets, there is an interval of N symbols between the first SRS resource and the second SRS resource, and N is a positive integer greater than or equal to Y.

In an implementation, in response to the value of Y being greater than or equal to a first threshold value or the value of Y being a specific value:

for a first SRS resource and a second SRS resource in different SRS resource sets in a same SRS resource set group, there is an interval of N symbols between the first SRS resource and the second SRS resource, and N is a positive integer greater than or equal to Y.

In an implementation, the first threshold value or the specific value is determined by a protocol.

In an implementation, the at least one SRS resource occupies a part or all of symbols in one slot.

In an implementation, the number of symbols occupied by the at least one SRS resource is determined based on a second capability of the first terminal.

In an implementation, the part or all of the symbols are at least one of the last symbols in the one slot.

In an implementation, the device further includes a reporting unit 402;

wherein in response to that the reporting unit 402 does not report the second capability of the first terminal, the part or all of the symbols are one or more symbols in the last 6 symbols in the one slot.

In an implementation, the device further includes a reporting unit 402;

wherein in response to that the reporting unit 402 reports the second capability of the first terminal, the part or all of the symbols are one or more symbols in the last Z1 symbols in the one slot, and a value of Z1 is determined based on a protocol.

In an implementation, the value of Z1 is 14.

In an implementation, the device further includes a reporting unit 402;

wherein in response to that the reporting unit 402 reports the second capability of the first terminal and the second capability carries a value of Z2, the part or all of the symbols are one or more symbols in the last Z2 symbols in the one slot, and Z2 is a positive integer.

In an implementation, the value of Z2 is greater than 6; or, the value of Z2 is greater than or equal to 6.

In an implementation, the device further includes a reporting unit 402;

wherein in response to that the reporting unit 402 reports the second capability of the first terminal and the second capability carries a value of Z3, the part or all of the symbols are one or more symbols among the Z3-th symbol to the last symbol in the one slot, and Z3 is a positive integer.

In an implementation, the value of Z3 is smaller than 9; or, the value of Z3 is smaller than or equal to 9.

In an implementation, the value of Z3 is smaller than 8; or, the value of Z3 is smaller than or equal to 8.

In an implementation, each SRS resource set in the at least one SRS resource set is configured to support antenna switching of type xTyR, where x and y are both positive integers;

wherein in response to x being smaller than y, different SRS resource sets cannot be transmitted on a same slot;

wherein in response to x being equal to y, different SRS resource sets cannot be transmitted on a same symbol.

In an implementation, SRS ports of different SRS resources in a same SRS resource set correspond to different terminal antenna ports.

In an implementation, SRS ports of different SRS resources in a same SRS resource set group in the at least one SRS resource set group correspond to different terminal antenna ports.

In an implementation, the device further includes a reporting unit 402.

The reporting unit 402 is configured to report a third capability of the first terminal, wherein the third capability of the first terminal is used to indicate that the first terminal supports the antenna switching of the type xTyR.

In an implementation, a value of x is: one of 1, 2, and 4; and a value of y is: one of 1, 2, 4, 6, and 8; or one of 1, 2, 4, and 8; or one of 1, 2, 4, and 6.

In an implementation, the device further includes a transmission unit 403.

The transmission unit 403 is configured to send an SRS signal to a network device or a second terminal on the at least one SRS resource based on the first configuration information.

In an implementation, the SRS signal is used for the network device or the second terminal to perform measurement, determine precoding corresponding to the first terminal based on a measurement result, and perform transmission of a channel or signal based on the precoding.

Those skilled in the art should understand that for the relevant description of the above-mentioned information configuration device in the embodiments of the present disclosure, reference can be made to the relevant description of the information configuration method in the embodiments of the present disclosure.

Figure 5:
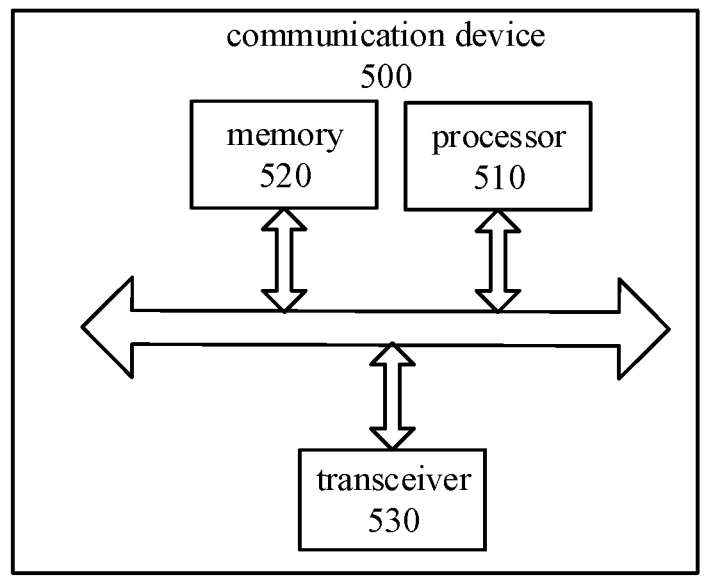
FIG. 5 is a schematic structural diagram of a communication device according to an embodiment of the present disclosure.

FIG. 5 is a schematic structural diagram of a communication device 500 according to an embodiment of the present disclosure. The communication device may be a terminal, or may be a network device. The communication device 500 shown in FIG. 5 includes a processor 510, and the processor 510 may call and run a computer program from a memory to perform the method in embodiments of the present disclosure.

According to embodiments, as shown in FIG. 5, the communication device 500 may further include a memory 520. The processor 510 may call and run a computer program from the memory 520 to perform the method in embodiments of the present disclosure.

The memory 520 may be a separate device independent of the processor 510, or may be integrated in the processor 510.

According to embodiments, as shown in FIG. 5, the communication device 500 may further include a transceiver 530, and the processor 510 may control the transceiver 530 to communicate with other devices. Specifically, the transceiver may send information or data to other devices, or receive information or data sent by other devices.

The transceiver 530 may include a transmitter and a receiver. The transceiver 630 may further include one or more antennas.

According to embodiments, the communication device 500 may specifically be the network device according to an embodiment of the present disclosure, and the communication device 500 may implement the corresponding processes implemented by the network device in the method embodiments of the present disclosure.

According to embodiments, the communication device 500 may specifically be the mobile terminal/terminal in embodiments of the present disclosure, and the communication device 500 may implement the corresponding processes implemented by the mobile terminal/terminal in the method embodiments of the present disclosure. For brevity, details are not repeated here.

Figure 6:
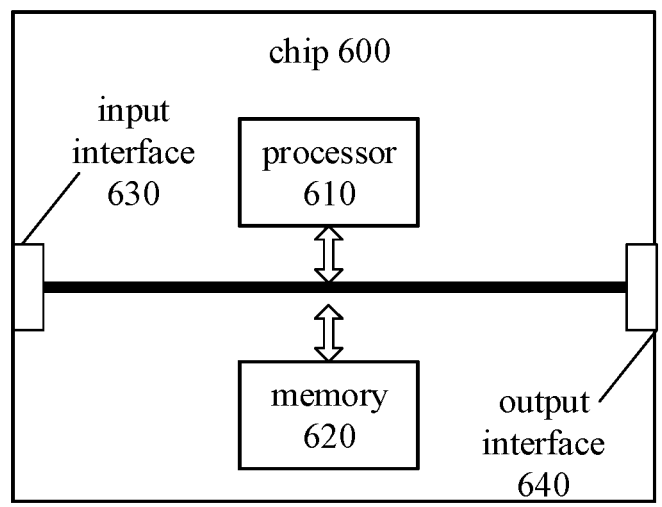
FIG. 6 is a schematic structural diagram of a chip according to an embodiment of the present disclosure.

FIG. 6 is a schematic structural diagram of a chip according to an embodiment of the present disclosure. The chip 600 shown in FIG. 6 includes a processor 610, and the processor 610 can call and run a computer program from a memory to implement the method according to embodiments of the present disclosure.

According to embodiments, as shown in FIG. 6, the chip 600 may further include a memory 620. The processor 610 may call and run a computer program from the memory 620 to implement the method according to embodiments of the present disclosure.

The memory 620 may be a separate device independent of the processor 610, or may be integrated in the processor 610.

According to embodiments, the chip 600 may further include an input interface 630. The processor 610 may control the input interface 630 to communicate with other devices or chips, and specifically, the processor 610 can control the input interface to obtain information or data sent by other devices or chips.

According to embodiments, the chip 600 may further include an output interface 640. The processor 610 can control the output interface 640 to communicate with other devices or chips, and specifically, the processor 610 can control the output interface 640 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the mobile terminal/terminal in embodiments of the present disclosure, and the chip can implement the corresponding processes implemented by the mobile terminal/terminal in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 7:
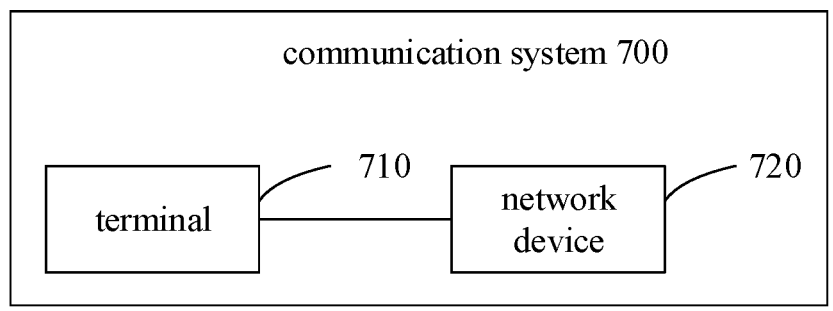
FIG. 7 is a schematic block diagram of a communication system according to an embodiment of the present disclosure.

FIG. 7 is a schematic block diagram of a communication system 700 according to an embodiment of the present disclosure. As shown in FIG. 7, the communication system 700 includes a terminal 710 and a network device 720.

The terminal 710 may be used to implement the corresponding functions implemented by the terminal in the foregoing method embodiments, and the network device 720 may be used to implement the corresponding functions implemented by the network device in the foregoing method embodiments. For brevity, details are not described herein again.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal in embodiments of the present disclosure, and the computer programs cause a computer to perform the corresponding processes implemented by the mobile terminal/terminal in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal in embodiments of the present disclosure, and the computer program instructions cause a computer to perform the corresponding processes implemented by the mobile terminal/terminal in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal in embodiments of the present disclosure, and when the computer program runs on a computer, the computer is caused to perform the corresponding processes implemented by the mobile terminal/terminal in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. An information configuration method, comprising:
receiving, by a first terminal, first configuration information, wherein the first configuration information is used to determine at least one Sounding Reference Signal (SRS) resource set group, each SRS resource set group in the at least one SRS resource set group comprises at least one SRS resource set, and each SRS resource set in the at least one SRS resource set comprises at least one SRS resource;
wherein for multiple SRS resources in a same SRS resource set transmitted on a same slot, there is an interval of Y symbols between two adjacent SRS resources in the multiple SRS resources, and a value of Y is determined based on at least one of a subcarrier spacing of the SRS resources or a first capability of the first terminal;
wherein in response to the value of Y being greater than or equal to a first threshold value or the value of Y being a specific value:

for a first SRS resource and a second SRS resource in different SRS resource sets, there is an interval of N symbols between the first SRS resource and the second SRS resource, and N is a positive integer greater than or equal to Y.

2. The method according to claim 1, wherein a usage parameter corresponding to each of the at least one SRS resource set is set to a first value, and the first value is used to indicate that the SRS resource set is used for antenna switching.

3. The method according to claim 1, wherein a resource type parameter corresponding to the at least one SRS resource set in a same SRS resource set group is set to a same value.

4. The method according to claim 3, wherein a value of the resource type parameter is one of the following:
 a second value, wherein the second value is used to indicate that the at least one SRS resource set is an aperiodic resource;
 a third value, wherein the third value is used to indicate that the at least one SRS resource set is a semi-persistent resource; or
 a fourth value, wherein the fourth value is used to indicate that the at least one SRS resource set is a periodic resource.

5. The method according to claim 4, wherein in response to the value of the resource type parameter being the third value or the fourth value, the at least one SRS resource set group comprises one SRS resource set.

6. The method according to claim 1, wherein a resource type parameter corresponding to the at least one SRS resource set in different SRS resource set groups is set to different values.

7. The method according to claim 6, wherein the resource type parameter has a value which is one of the following:
 a second value, wherein the second value is used to indicate that the at least one SRS resource set is an aperiodic resource;
 a third value, wherein the third value is used to indicate that the at least one SRS resource set is a semi-persistent resource; or
 a fourth value, wherein the fourth value is used to indicate that the at least one SRS resource set is a periodic resource.

8. The method according to claim 1, wherein the first configuration information is sent to the first terminal by a network device or by a second terminal.

9. The method according to claim 1, wherein a value of the subcarrier spacing corresponding to each SRS resource in the at least one SRS resource is:
 one of 15 kHz, 30 kHz, 60 kHz, 120 kHz, 240 kHz, 480 kHz, 960 kHz, and 1920 kHz; or,
 one of 15 kHz, 30 kHz, 60 kHz, 120 kHz, 240 kHz, 480 kHz, and 960 kHz; or,
 one of 15 kHz, 30 kHz, 60 kHz, 120 kHz, 240 kHz, and 480 kHz; or,
 one of 15 kHz, 30 kHz, 60 kHz, 120 kHz, and 240 kHz.

10. The method according to claim 1, wherein:
 the value of Y is determined based on a first table; or, the value of Y is determined based on the first capability of the first terminal; or,
 wherein the value of Y is determined according to the first table, and the first table is determined according to the first capability of the first terminal.

11. The method according to claim 10, wherein the first capability of the first terminal comprises a capability of the first terminal for at least one frequency band, or comprises a capability of the first terminal for at least one frequency band combination; or
 wherein the first capability of the first terminal comprises a capability of the first terminal for at least one subcarrier spacing.

12. The method according to claim 1, further comprising:
 reporting, by the first terminal, first capability signaling, wherein the first capability signaling is used to determine the first capability of the first terminal, and the first capability signaling carries the value of Y corresponding to the first capability of the first terminal.

13. The method according to claim 12, wherein the first capability of the first terminal comprises a capability of the first terminal for at least one frequency band, or a capability of the first terminal for at least one frequency band combination;
 wherein the first capability signaling carries the value of Y reported by the first terminal for each frequency band in the at least one frequency band, or the first capability signaling carries the value of Y reported by the first terminal for each frequency band combination in the at least one frequency band combination; or,
 wherein the first capability of the first terminal comprises a capability of the first terminal for at least one subcarrier spacing;
 wherein the first capability signaling carries the value of Y reported by the first terminal for each subcarrier spacing in the at least one subcarrier spacing.

14. The method according to claim 12, wherein the reporting of the first capability signaling by the first terminal comprises:
 reporting, by the first terminal, the first capability signaling to a network device, wherein the first capability signaling is forwarded by the network device to a second terminal; or
 wherein the reporting of the first capability signaling by the first terminal comprises:
 reporting, by the first terminal, the first capability signaling to a second terminal.

15. The method according to claim 1, wherein in response to the value of Y being greater than or equal to the first threshold value or the value of Y being the specific value:
 for a first SRS resource and a second SRS resource in a same SRS resource set, the first SRS resource and the second SRS resource are transmitted on different slots, there is an interval of N symbols between the first SRS resource and the second SRS resource, and N is a positive integer greater than or equal to Y; or
 for a first SRS resource and a second SRS resource in different SRS resource sets in a same SRS resource set group, there is an interval of N symbols between the first SRS resource and the second SRS resource, and N is a positive integer greater than or equal to Y.

16. The method according to claim 1, wherein the at least one SRS resource occupies a part or all of symbols in one slot.

17. The method according to claim 1, wherein each SRS resource set in the at least one SRS resource set is configured to support antenna switching of type xTyR, where x and y are both positive integers;
 wherein in response to x being smaller than y, different SRS resource sets cannot be transmitted on a same slot;
 wherein in response to x being equal to y, different SRS resource sets cannot be transmitted on a same symbol.

18. The method according to claim 1, wherein SRS ports of different SRS resources in a same SRS resource set correspond to different terminal antenna ports; or
wherein SRS ports of different SRS resources in a same SRS resource set group in the at least one SRS resource set group correspond to different terminal antenna ports.

19. A first terminal, comprising a processor, a transceiver, memory and instructions stored in the memory that, when executed by the processor, cause the first terminal to:
receive first configuration information, wherein the first configuration information is used to determine at least one Sounding Reference Signal (SRS) resource set group, each SRS resource set group in the at least one SRS resource set group comprises at least one SRS resource set, and each SRS resource set in the at least one SRS resource set comprises at least one SRS resource;
wherein for multiple SRS resources in a same SRS resource set transmitted on a same slot, there is an interval of Y symbols between two adjacent SRS resources in the multiple SRS resources, and a value of Y is determined based on at least one of a subcarrier spacing of the SRS resources or a first capability of the first terminal;
wherein in response to the value of Y being greater than or equal to a first threshold value or the value of Y being a specific value:
for a first SRS resource and a second SRS resource in different SRS resource sets, there is an interval of N symbols between the first SRS resource and the second SRS resource, and N is a positive integer greater than or equal to Y.

20. A network device, comprising a processor, a transceiver, memory and instructions stored in the memory that, when executed by the processor, cause the network device to:
send first configuration information to a first terminal, wherein the first configuration information is used to determine at least one Sounding Reference Signal (SRS) resource set group, each SRS resource set group in the at least one SRS resource set group comprises at least one SRS resource set, and each SRS resource set in the at least one SRS resource set comprises at least one SRS resource;
wherein for multiple SRS resources in a same SRS resource set transmitted on a same slot, there is an interval of Y symbols between two adjacent SRS resources in the multiple SRS resources, and a value of Y is determined based on at least one of a subcarrier spacing of the SRS resources or a first capability of the first terminal;
wherein in response to the value of Y being greater than or equal to a first threshold value or the value of Y being a specific value:
for a first SRS resource and a second SRS resource in different SRS resource sets, there is an interval of N symbols between the first SRS resource and the second SRS resource, and N is a positive integer greater than or equal to Y.

\* \* \* \* \*